United States Patent
Anker et al.

[15] 3,653,925

[45] Apr. 4, 1972

[54] METHOD OF PREPARING GLUTEN CONTAINING FILMS AND COATINGS

[72] Inventors: Charles A. Anker; George A. Foster, Jr.; Mary Ann Loader, all of Minneapolis, Minn.

[73] Assignee: General Mills, Inc.

[22] Filed: Sept. 18, 1969

[21] Appl. No.: 859,213

[52] U.S. Cl. ..............................99/166, 99/168, 99/171 LP, 106/153, 106/154 R, 106/161, 117/164, 264/212
[51] Int. Cl......................A23b 7/00, C08h 7/00, C08h 17/26
[58] Field of Search..................107/54 H; 99/166, 168, 169, 99/171 LP; 106/161, 154, 149, 124, 311, 153; 117/164; 264/212; 260/112 G; 252/364, 311

[56] References Cited

UNITED STATES PATENTS

| | | | |
|---|---|---|---|
| 2,461,829 | 2/1949 | Lowen | 106/135 X |
| 3,351,531 | 11/1967 | Noznick et al. | 99/166 X |
| 2,567,980 | 9/1951 | Tuomy et al. | 260/112 G X |
| 2,158,481 | 5/1939 | Hansen et al. | 99/166 UX |
| 3,100,710 | 8/1963 | Carlin | 99/107 |
| 2,836,495 | 5/1958 | Thompson et al. | 99/166 X |

Primary Examiner—Joseph Scovronek
Assistant Examiner—Stephen B. Davis
Attorney—Anthony A. Juettner and Gene O. Enockson

[57] ABSTRACT

Dried wheat gluten is dispersed in an alkaline medium consisting of alcohol and water. The dispersion is applied to solid substrates including food and dried to form an edible coating. The coating can be stripped from the substrate as a continuous film. A portion of a second proteinaceous substance and a plasticizer can be included in the dispersion.

12 Claims, No Drawings

METHOD OF PREPARING GLUTEN CONTAINING FILMS AND COATINGS

The present invention relates to a new and useful process of preparing films and coatings comprised of wheat gluten. This invention also relates to the resulting films and coated articles. The films and coatings of this invention are strong and flexible and find numerous uses, particularly in the food area.

We have discovered that highly useful wheat gluten films and coatings may be prepared from certain alkaline, relatively homogeneous, fluid dispersions of wheat gluten. These dispersions are made in various alcohol-water mixtures, and the films and coatings are formed therefrom by a commercially practicable method. Films formed by spreading or casting these dispersions in air are found to have desirable characteristics which render them particularly useful for various coating or packaging applications in the food area.

The films and coatings of this invention contain a high amount of protein. Thus, when reagents used in their preparation are selected so as to not include harmful or disagreeable chemicals, they are edible and nutritious. Further, no reagents are required in this invention which would impart undesirable odors to the films or coatings.

This invention has commercial attractiveness for several reasons. No expensive materials are required to disperse the wheat gluten in the aqueous-alcohol mixtures. The wheat gluten used is dispersible in our mixtures, and it is thus unnecessary to attempt to separate large amounts of undispersed wheat gluten from the extrudable or castable dispersion. Further, temperatures above the boiling point of the aqueous mixtures are not necessary to disperse the wheat gluten, and thus expensive pressurized processing equipment is not required.

Thus it is an object of this invention to provide a new and useful process for preparing wheat gluten containing films and coatings. It is also an object of this invention to provide films and coatings from certain heated, relatively homogeneous aqueous dispersions of wheat gluten. These and other objectives will become apparent in the description which follows.

As indicated, the products of this invention are formed from heated, fluid dispersions of wheat gluten in various alkaline alcohol-water mixtures.

Wheat gluten is a protein substance comprised of a mixture of polypeptide molecules found in wheat. These polypeptides are generally characterized as globular proteins. That is, gluten is not comprised primarily of thread-like bundles of helical polypeptide chains characteristic of various fibrous proteins. Instead, the structure is more random and is comprised of two separable components or fractions, namely glutenin and gliadin. While we do not wish to be bound by the following, it is believed that the glutenin fraction is the most important in preparing the films and coatings of the present invention. Be that as it may, it is not necessary for the practice of the invention to separate the indicated fractions and whole wheat gluten is an entirely satisfactory ingredient for use in the dispersions.

The wheat gluten is obtained by separating it from wheat by any convenient means and the same is readily available commercially. The gluten is most easily used when it is in a finely divided form. For example, spray dried and flash dried wheat gluten are commercially available forms which are entirely suitable. One preferred commercially available wheat gluten product is Pro–80, available from General Mills, Inc. This product is a flash dried vital wheat gluten which may contain several percent moisture and on a moisture-free basis is comprised of about 80 percent vital wheat gluten, 5–10 percent fat and 10–15 percent starch. It is preferred that the gluten source contains at least about 80 percent vital wheat gluten, with the remainder being diluent materials such as residual fat or lipid, starch, flour and the like. Wheat gluten products containing up to about 35 percent of diluent materials can be used in the practice of the invention.

The alcohols which are useful in obtaining the desired wheat gluten dispersions consist of various water soluble monohydroxy aliphatic alcohols containing one to four carbon atoms. It is preferred to use such aliphatic alcohols which contain no more than three carbon atoms.

The alcohol-water ratio (volume basis) in the alkaline wheat gluten dispersions or solutions is preferably between about 5:2 to about 1:15. Where this ratio is less than about 1:15, there is not enough alcohol to wet the gluten and disperse it uniformly; and where this ratio is greater than about 5:2, a flaky, noncontinuous film or coating is formed. It is also preferred that the protein-liquid ratio (weight basis), not including plasticizers, be between about 1:20 and 1:6 in the dispersion mixtures. At protein-liquid ratios greater than about 1:6, it is difficult to obtain a relatively homogeneous dispersion. Where that ratio is less than about 1:20, relatively homogeneous dispersions may be prepared, but films formed therefrom are very thin.

It is necessary that the wheat gluten dispersions used in our process be alkaline. The alkalinity is provided by one or more of various water soluble inorganic bases, including ammonium hydroxide, and a variety of metal hydroxides. Among the preferred reagents of this type are ammonium hydroxide, sodium hydroxide and potassium hydroxide. Where wheat gluten films or coatings are to be formed in air, it is preferred that the alkalinity be provided by ammonium hydroxide because its relatively high volatility encourages drying of the product and results in products of nearly neutral pH. Where sodium hydroxide or potassium hydroxide are used, good films and coatings are formed, but it may be desirable where food applications are sought, to reduce the basic pH of the products by a subsequent treatment, e.g. by passing the products through a mild acid solution. The dispersions have an alkaline pH which will be above 7.0 and up to 12 or higher.

A variety of ingredients may be included in the dispersions to impart increased flexibility to the products prepared therefrom. Such ingredients may be termed "plasticizers," and may include various polyols and higher molecular weight alcohols such as glycerol, propylene glycol, diglycerol, 1,2,6-hexanetriol, triethanolamine, polyethylene glycols and the like. Where food applications are sought for the films and coatings of this invention, plasticizers should not be used which would impart undesirable odor or taste to the products. Preferred plasticizers comprise glycerol and diglycerol. For example, glycerol has been used in amounts up to about 80 percent of the weight of the protein, although amounts up to about 50 percent are preferred. When more than about 50 percent plasticizer is used, based on the weight of the protein, the resulting films and coatings tend to be too sticky to handle conveniently, and tend to be weak. Where less than about 20 percent glycerol is used, the films and coatings tend to become brittle.

When no plasticizer is included in the gluten dispersion, initially flexible films and coatings may be produced. However, such films and coatings tend to become brittle upon drying. Thus, when it is desired to form products which retain their flexibility, it is necessary either to include a plasticizer in the dispersion or to subject the resulting film or coating to a plasticizing treatment. Where desired flexibility is to be achieved by subjecting the films or coatings to a plasticizing treatment, means which bring the plasticizer into contact with such products will serve this result. For example, a solution of glycerol in water or ethanol provides a suitable plasticizing bath to which the films or coatings of this invention may be subjected. The films and coatings of this invention may be plasticized subsequent to their formation, for example, by immersing the same in a 20 to 80 percent by weight solution of glycerol in water or ethanol or mixtures thereof.

It may be desirable for certain applications of this invention to use proteins in addition to wheat gluten in preparing the dispersion mixtures. Various animal and vegetable proteins can be so used. For example, useful films have been prepared from dispersion mixtures of this invention wherein up to 50 percent of the protein was soy protein isolate, the remainder being wheat gluten. Similarly, useful films have been prepared wherein 20 percent of the protein was zein, remainder being wheat gluten. In general the wheat gluten comprises at least about 50 percent by weight of the total protein in the dispersion and preferably 75 to 100 percent by weight of the total protein.

The alkaline alcohol-water dispersion mixtures are heated above room temperature to attain thorough dispersion of the protein therein. Where sodium hydroxide or potassium hydroxide are used to provide alkalinity and/or where the amount of wheat gluten in the dispersion is small, heating to the boiling point of the mixtures may not be necessary to obtain suitable dispersions. But where ammonium hydroxide is used to provide alkalinity and/or where more than about 2 percent (by weight) of the dispersion mixture is wheat gluten, it is necessary to heat well above room temperature to achieve a homogeneous dispersion. The dispersion mixtures need not however be heated above their respective boiling points at atmospheric pressure. Thus in any particular instance, the temperature necessary depends upon the particular ingredients present and upon the relative amounts thereof. For example, where alkalinity is provided by ammonium hydroxide, and where about 7 percent or more, (by weight) of the mixture is wheat gluten, it is preferred to heat such mixture to its boiling point. Heating thus aids in dispersing the wheat gluten and, where the gluten films and coatings are formed in air, prior heating also serves to increase the rate of evaporation of the solvents from such products.

The dispersions may be applied to various substrate surfaces or entire articles by any of a number of methods wherein a relatively uniform coating is obtained. Thus, for example, the dispersion may be sprayed or brushed on the surface or the dispersion may be cast thereon using, for example, a spreader bar. The surface or article may also be dipped into the dispersion and then removed therefrom. Where the dried coating is to be removed from the substrate surface as a film, it is preferred to use a substantially unreactive surface such as glass, stainless steel and various plastics. The surface should not be so smooth or non-reactive that the surface tension of the dispersion tends to be greater than its adhesion to the surface. Such surfaces will not be uniformly wetted by the dispersion and will tend to give films of uneven thickness. Films can be stripped from more reactive surfaces by various physical means such as sharp blades. And, of course, where the coating is to remain on the surface such as when various foods including apple slices, candies, shelled nuts and the like are coated, it will often be desirable that the same firmly adheres to the surface or surfaces.

The coatings are allowed to dry to become solid and essentially continuous. Drying or setting of the coatings may be hastened by means commonly used to encourage evaporation of the dispersing solvents--i.e. by the use of a circulating stream of air or other gas and/or heat such as obtained by various heaters including heat lamps. However, even without such means to encourage more rapid drying, many of the coatings will set up in a matter of minutes to a few hours at ambient room temperatures and pressures. The essentially continuous films and coatings of the present invention can be of various thicknesses but will preferably be from about 0.5 to 50 mils in thickness.

Many of the films and coatings formed by our new process are edible and odor-free, thus finding particularly useful applications in the food area. For example, various films of this invention have been used to wrap, package or encase food articles, including cheeses, sandwiches and various hors d'oeuvres.

The following examples will serve to further illustrate the process and the products of this invention.

EXAMPLE I

To a mixture of 24 ml. 95 percent ethanol and 2 g. glycerol was added 5 g. Pro–80. The resulting mixture was warmed and stirred while 16 ml. water and 4 ml. 6 N ammonium hydroxide were added. The mixture was boiled briefly until the wheat gluten was dispersed, and was then cast on a flat nonreactive surface (glass), using a spreader bar with a 6 mil gap to obtain a film of uniform thickness. The film was dried at ambient room temperature (about 75° F.) and could easily be removed from the flat surface. The dried film was translucent, flexible, strong and had a thickness of about 1.5 mil.

EXAMPLES II-VIII

| Example | Pro-80, g. | Glycerol, g. | H₂O, ml. | 95% EtOH, ml. | 6 N NH₄OH, ml. | Zein, g. | Soy protein, g. |
|---|---|---|---|---|---|---|---|
| II | 7 | 2 | 16 | 24 | 4 | | |
| III | 3.5 | 2 | 16 | 24 | 4 | | |
| IV | 5 | 2 | 16 | 24 | 4 | | |
| V | 5 | 2 | | 24 | 20 | | |
| VI | 5 | 2 | 16 | 24 | 1 | | |
| VII | 2.5 | 2 | 16 | 24 | 4 | | 2.5 |
| VIII | 4 | 2 | 16 | 24 | 4 | 1.0 | |

In Examples II-VIII, wheat gluten films were prepared according to the method used in Example I. The soy protein used in Example VII was a commercially available soy protein isolate (Promine D). The zein used in Example VIII was a commercially available corn zein. The films produced in Examples II-VIII were strong, translucent, flexible, and could be used to wrap or package food items, including hors d'oeuvres.

From the foregoing examples and description, it should be apparent that a new process has been developed for the forming of various useful wheat gluten articles.

The embodiments of the invention in which an exclusive property or privilege is claimed are defined as follows:

1. The process of coating a solid substrate which comprises: (1) applying to at least a portion of one surface thereof a coating consisting of a fluid, relative homogeneous, alkaline dispersion of dried wheat gluten in an alcohol-water dispersing medium wherein the alcohol is a monohydroxy aliphatic alcohol of one to four carbon atoms, the dispersion obtains its alkalinity from a water soluble inorganic base, the weight ratio of protein to dispersing medium is in the range of about 1:20 to 1:6 and the volume ratio of alcohol to water is between about 5:2 and 1:15; and (2) drying the coating on the substrate.

2. The process of claim 1 wherein the water soluble inorganic base is selected from the group consisting of sodium hydroxide, potassium hydroxide and ammonium hydroxide.

3. The process of claim 2 wherein the water soluble inorganic base is ammonium hydroxide.

4. The process of claim 1 wherein the monohydroxy aliphatic alcohol contains one to three carbon atoms.

5. The process of claim 4 wherein the alcohol is ethanol.

6. The process of claim 1 wherein the dispersion also contains a plasticizer.

7. The process of claim 6 wherein the plasticizer is glycerol and the glycerol is present in an amount of about 20 to 50 percent by weight based on the weight of the portion.

8. The process of claim 1 wherein up to about 50 percent by weight of the dried wheat gluten is replaced by a second protein.

9. The process of claim 1 wherein the entire substrate is coated with the dispersion.

10. The process of claim 1 wherein the dried coating is (3) stripped from the substrate surface as a relatively continuous film.

11. The process of claim 1 wherein the dried coating has a thickness of about 0.5 to 50 mils.

12. The process of claim 1 wherein the water soluble inorganic base is ammonium hydroxide, the alcohol is ethanol, the dispersion contains glycerol in an amount of about 20 to 50 percent by weight based on the weight of the protein, the substrate has an essentially non-reactive surface and the dried coating is (3) stripped from the substrate surface as a relatively continuous film.

* * * * *

PO-1050
(5/69)

UNITED STATES PATENT OFFICE
CERTIFICATE OF CORRECTION

Patent No. 3,653,925      Dated April 4, 1972

Inventor(s) Charles A. Anker, George A. Foster, Jr., Mary Anne Loader

It is certified that error appears in the above-identified patent and that said Letters Patent are hereby corrected as shown below:

Column 4, line 33, "relative" should read -- relatively --; line 54, "portion" should read -- protein --.

Signed and sealed this 5th day of September 1972.

(SEAL)
Attest:

EDWARD M. FLETCHER, JR.
Attesting Officer

ROBERT GOTTSCHALK
Commissioner of Patents